(12) United States Patent
Kodama

(10) Patent No.: US 12,582,979 B2
(45) Date of Patent: Mar. 24, 2026

(54) MAINTAINING METHOD FOR COOLING SYSTEM

(71) Applicant: TOYOTA JIDOSHA KABUSHIKI KAISHA, Toyota (JP)

(72) Inventor: Yasuaki Kodama, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 376 days.

(21) Appl. No.: 18/207,811

(22) Filed: Jun. 9, 2023

(65) Prior Publication Data

US 2024/0066516 A1 Feb. 29, 2024

(30) Foreign Application Priority Data

Aug. 24, 2022 (JP) ................................. 2022-133528

(51) Int. Cl.
| | |
|---|---|
| *B01J 47/018* | (2017.01) |
| *B01J 39/04* | (2017.01) |
| *B01J 41/04* | (2017.01) |
| *H01M 8/04029* | (2016.01) |
| *H01M 8/04044* | (2016.01) |
| *B01J 47/04* | (2006.01) |

(52) U.S. Cl.
CPC .............. *B01J 47/018* (2017.01); *B01J 39/04* (2013.01); *B01J 41/04* (2013.01); *H01M 8/04029* (2013.01); *B01J 47/04* (2013.01); *H01M 8/04044* (2013.01); *Y02E 60/50* (2013.01)

(58) Field of Classification Search
CPC . B01J 47/018; B01J 39/04; B01J 41/04; B01J 47/04; H01M 8/04029; H01M 8/04044; Y02E 60/50

USPC ......................................... 210/663, 666, 668
See application file for complete search history.

(56) References Cited

U.S. PATENT DOCUMENTS

| | | | |
|---|---|---|---|
| 2004/0028963 A1 | 2/2004 | Kormann et al. | |
| 2007/0298291 A1* | 12/2007 | Nishii ............... | H01M 8/04029 |
| | | | 429/492 |
| 2012/0064426 A1 | 3/2012 | Sato et al. | |
| 2020/0040246 A1* | 2/2020 | Arai ......................... | C09K 5/10 |

FOREIGN PATENT DOCUMENTS

| | | | | |
|---|---|---|---|---|
| CA | 2574784 A1 * | 1/2006 | ........ | H01M 8/04044 |
| CN | 102403520 B * | 7/2015 | .............. | B60L 50/71 |
| EP | 1739775 B1 * | 11/2011 | ........ | H01M 8/04029 |
| JP | 2004127620 A * | 4/2004 | | |
| JP | 2004-526280 A | 8/2004 | | |
| JP | 2005050731 A * | 2/2005 | ........ | H01M 8/04029 |
| JP | 2005-190705 A | 7/2005 | | |
| JP | 2012-64349 A | 3/2012 | | |

(Continued)

OTHER PUBLICATIONS

Machine-generated Enlgish translation of JP 2016170962, generated on Aug. 14, 2025.*

(Continued)

*Primary Examiner* — Fred Prince
(74) *Attorney, Agent, or Firm* — Oliff PLC

(57) ABSTRACT

A method of maintaining a cooling system includes the steps of introducing an ion exchange resin into a cooling path, performing ion cleaning of a coolant in the cooling path with the ion exchange resin, and adding an additive to the cooling path after removing the ion exchange resin from the cooling path.

7 Claims, 3 Drawing Sheets

(56)                 References Cited

FOREIGN PATENT DOCUMENTS

| JP | 2016170962 A | * | 9/2016 | |
| WO | WO-2010096028 A1 | * | 8/2010 | ........ H01M 8/04164 |

OTHER PUBLICATIONS

Machine-generated Enlgish translation of JP 2004127620, generated on Aug. 14, 2025.*

Machine-generated English translation of JP 2005050731, generated on Dec. 16, 2025.*

Machine-generated English translation of CN 102403520, generated on Dec. 16, 2025.*

* cited by examiner

FIG. 2C

COOLANT

FIG. 2B

COOLANT

FIG. 2A

COOLANT

ADDITIVE POSTFILL

ION REMOVAL

DEGRADED MATERIAL

ADDITIVE

MAINTAINING METHOD FOR COOLING SYSTEM

CROSS-REFERENCE TO RELATED APPLICATION

This application claims priority to Japanese Patent Application N 2022-133528 filed on Aug. 24, 2022, incorporated herein by reference in its entirety.

BACKGROUND

1. Technical Field

The present disclosure relates to a maintaining method for a cooling system.

2. Description of Related Art

Japanese Unexamined Patent Application Publication No. 2.012-064349 (JP 2012-064349 A) discloses a fuel cell system including an ion exchange resin that maintains the conductivity of cooling liquid, in which the cooling liquid contains an additive, and adsorption of the additive to the ion exchange resin is prepared in a saturated state.

SUMMARY

In the technique disclosed in JP 2012-064349 A, for example, there is an issue that adsorption (removal) of thermally deteriorated product ions and eluted ions from pipes is not sufficient.

The present disclosure has been made in view of the above, and an object thereof is to provide a maintaining method for a cooling system capable of sufficiently adsorbing thermally deteriorated product ions and eluted ions from pipes while maintaining the rust-preventive ability of cooling liquid.

A maintaining method for a cooling system according to the present disclosure includes: introducing an ion exchange resin into a cooling path; performing ion cleaning of cooling liquid in the cooling path by the ion exchange resin; and adding an additive into the cooling path after removing the ion exchange resin from the cooling path.

According to the present disclosure, it is possible to sufficiently adsorb the thermally deteriorated product ions and the eluted ions from the pipes while maintaining the rust-preventive ability of the cooling liquid.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2A is a diagram illustrating a flow of methods for maintaining a chiller according to an embodiment;

FIG. 2B is a diagram illustrating a flow of methods for maintaining a chiller according to an embodiment;

FIG. 2C is a diagram illustrating a flow of methods for maintaining a chiller according to an embodiment.

DETAILED DESCRIPTION OF EMBODIMENTS

Figure 1:
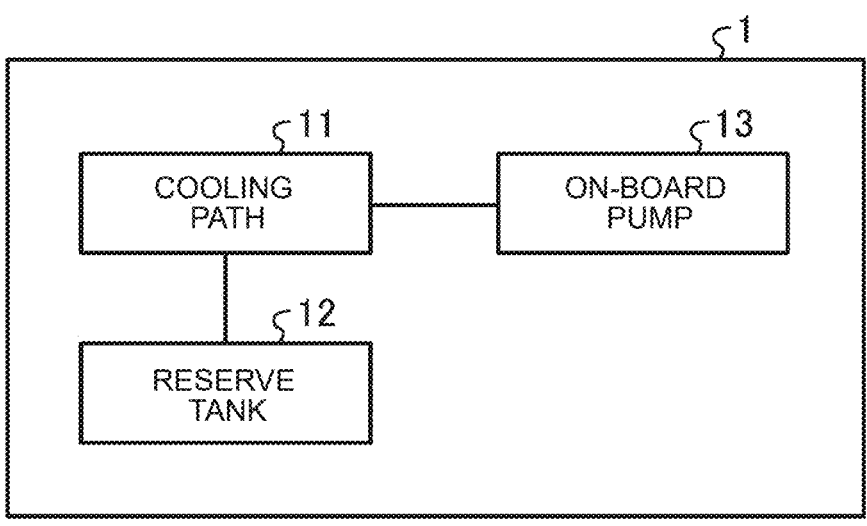
FIG. 1 is a front view illustrating a schematic configuration of a cooling system according to an embodiment.

A maintenance method of a cooling system according to an embodiment of the present disclosure will be described with reference to the drawings. Incidentally, the constituent elements in the following embodiments include those that can be easily replaced by a person skilled in the art or those that are substantially the same.

Here, in the cooling liquid used in the cooling system, a product due to thermal degradation such as an organic acid is ionized, or ions are eluted from a component material (for example, rubber, metal, or the like) of the cooling system, so that the conductivity of the cooling liquid is increased, and there is a possibility that the metal component is corroded.

Therefore, conventionally, it has been performed to remove ions in the cooling liquid using an ion exchange resin see JP 2012-064349 A), in the technique disclosed in JP 2012-064349 A, for example, thermal degradation products (e.g., formic acid, acetic acid, etc.) ions, there is a problem that adsorption (removal) of eluted ions from the pipe is not sufficient. The reasons include the following.

(1) The coolant additive is not a single component, but is composed of a number of components. Therefore, when all the additives of the cooling liquid are saturated and adsorbed in advance, the ion exchange capacity which is the original purpose is remarkably lowered, and therefore, the ions to be adsorbed cannot be adsorbed.

(2) Thermal degradation product ions are weak acids and are less likely to be adsorbed than additive ions due to their low ionization tendency. Therefore, if the additive is saturated and adsorbed beforehand, weak acids cannot be adsorbed.

(3) As a further battery electric vehicle specific problem, since the battery is installed under the floor, the position of the cooling-path is located below the engine-driven vehicle. Further, since the lower surface of the vehicle has road surface interference, it is not possible to install a drain cock which is a discharge port of the cooling liquid. As a result, the external discharge property at the liquid self-weight due to the difference in height is remarkably deteriorated. Therefore, the replacement workability of the cooling liquid is deteriorated, and it becomes difficult to maintain the quality of the cooling liquid. Further, in battery electric vehicle, it is difficult to secure a space in which the ion-exchange resin is permanently mounted.

Therefore, the inventors of the present disclosure have intensively studied to solve the problems (1) to (3) above, while maintaining the rust preventive ability of the cooling liquid, the thermal degradation product ions and the piping It was found a maintenance method that can be sufficiently adsorbed eluted ions.

The maintenance method of the cooling system according to the present embodiment is, for example, a method for maintaining a cooling system mounted on a battery electric vehicle. The present maintenance method can be performed at a timing such as periodic maintenance performed in a dealer of a vehicle, for example.

FIG. 1 shows a schematic configuration of a cooling system 1 to which the present maintenance method is applied. It should be noted that, in the cooling system 1, only the configuration necessary for the realization of the present embodiment is illustrated, and other configurations are omitted.

The cooling system 1 includes a cooling path 11, a reserve tank 12, and an in-vehicle pump 13. A cooling liquid circulates in the cooling path 11. The cooling liquid is based on, for example, an aqueous ethylene glycol solution, and a predetermined additive is added thereto. These additives include, for example, rust inhibitors, metal corrosion inhibitors (e.g., carboxylic acids, nitrates, nitrites, thiazoles, molybdates, borates, etc.), defoamers, pH modifiers, dyestuffs, tittering agents, etc.

The reserve tank 12 is a tank for storing a cooling liquid. The in-vehicle pump 13 circulates the cooling liquid in the cooling path 11. A separate pump may be prepared instead of the in-vehicle pump 13.

A procedure of the maintenance method of the cooling system according to the present embodiment will be described with reference to FIGS. 2A to 2C. In the maintenance method of the cooling system according to the present embodiment, the introduction step, the ion cleaning step, and the addition step are performed in this order.

Introduction Step

In the introduction step, the ion exchange resin is introduced into the cooling path 11. The ion exchange resin is, for example, a hydrogen ion type (H type) exchange resin (cation exchange resin) or a hydroxide ion type (OH type) exchange resin (anion exchange resin).

Ion Cleaning Step

In the ion cleaning step, ion cleaning of the cooling liquid in the cooling path 11 is performed by the ion exchange resin. Examples of the method of ion cleaning using an ion exchange resin include a batch method and a column method.

The batch method is a method in which an ion exchange resin is immersed in a cooling liquid. In the batch method, for example, the ion exchange resin is immersed in the reserve tank 12 for a predetermined time, and the ion exchange resin is removed when the ion cleaning is completed. In the batch method, since the ion exchange resin is immersed for a time corresponding to the degree of deterioration of the cooling liquid, there is an advantage that the workability is good.

The column method is a method in which the ion exchange resin is circulated in the cooling path 11. In the column method, for example, an ion exchange resin is mounted in the reserve tank 12, the cooling liquid is circulated by the in-vehicle pump 13, and the ion exchange resin is removed when the ion cleaning is completed. In the column system, since the cooling liquid is circulated after the ion exchange resin is installed in the cooling path 11, there is an advantage that the ion exchange efficiency is high.

For example, in a case where the degree of deterioration of the cooling liquid is small, ion cleaning may be performed using a batch method, and in a case where the degree of deterioration of the cooling liquid is large, ion cleaning may be performed using a column method. In this case, for example, the degree of deterioration of the cooling liquid may be predicted from the traveling distance and the traveling time of the vehicle after the previous maintenance, and the batch method or the column method may be selectively used in accordance with the prediction result. In addition, the amount, the ratio, and the like of the ion exchange resin may be selected according to the prediction result of the degree of deterioration.

Figures 2A, 2B, 2C:
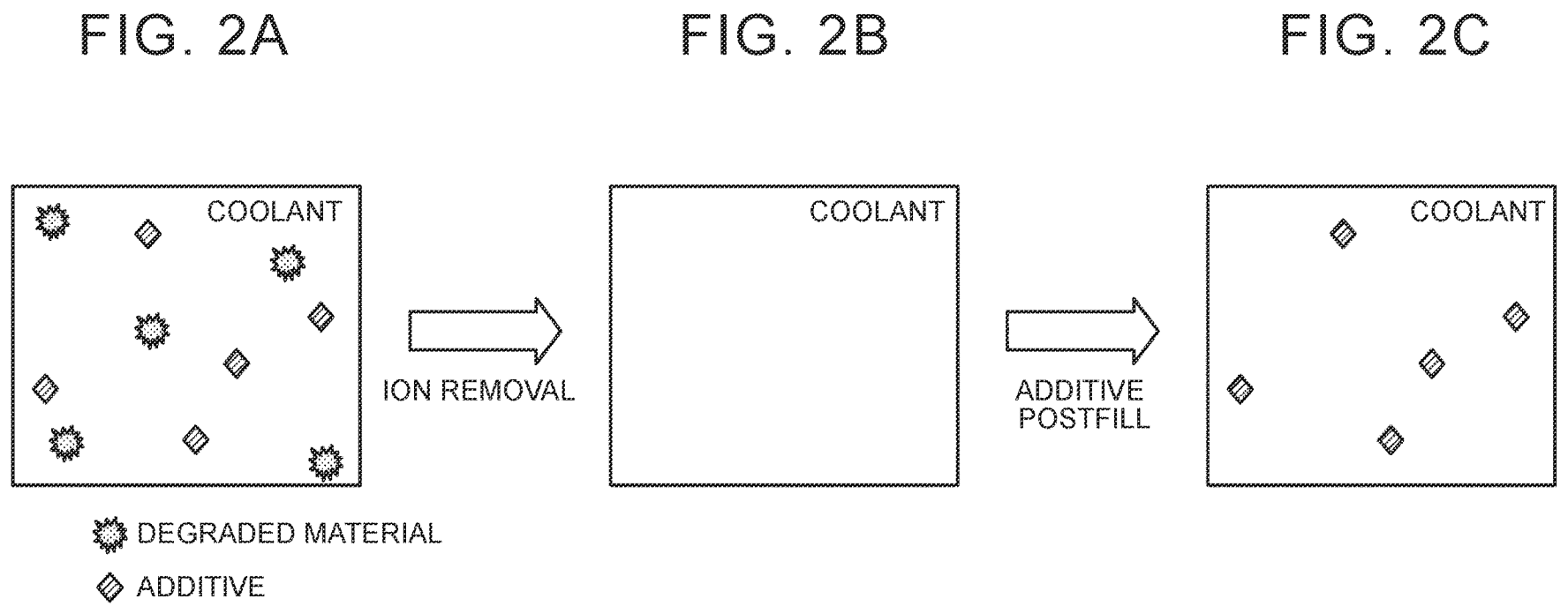

As described above, by performing the ion cleaning steps in a batch-type or column-type manner, deteriorated substances (thermally deteriorated product ions, eluted ions from pipes) and additives in the coolant are removed as shown in FIGS. 2A and 2B.

Addition Step

In the addition step, as shown in FIG. 2C, after the ion-exchange resin is removed from the cooling path 11, the additive is added into the cooling path 11. These additives include, for example, rust inhibitors, metal corrosion inhibitors (e.g., carboxylic acids, nitrates, nitrites, thiazoles, molybdates, borates, etc.), defoamers, pH modifiers, dyestuffs, bittering, agents, etc.

In the maintenance method of the cooling system according to the embodiment described above, the deteriorated substance and the additive in the cooling liquid are removed by temporarily utilizing the ion exchange resin, for example, at the time of periodic maintenance of the vehicle. Then, an additive such as a necessary rust inhibitor is added later. Accordingly, it is possible to sufficiently adsorb the thermally deteriorated product ions and the eluted ions from the piping while maintaining the rust-preventive ability of the cooling liquid.

EXAMPLES

An embodiment of a method for maintaining a cooling system according to an embodiment will be described with reference to FIG. 3. In the present embodiment, the maintenance method according to the embodiment is performed on the cooling system in which the cooling liquid is deteriorated by running, and the change in the conductivity (20° C. conductivity) is verified.

In this embodiment, an ion exchange resin obtained by mixing a hydrogen ion type (H type) cation exchange resin and a hydroxide ion type (OH type) anion exchange resin at a ratio of 1:1 was used 1.5 L. In addition, the "batch system" was implemented as the ion cleaning system.

Figure 3:
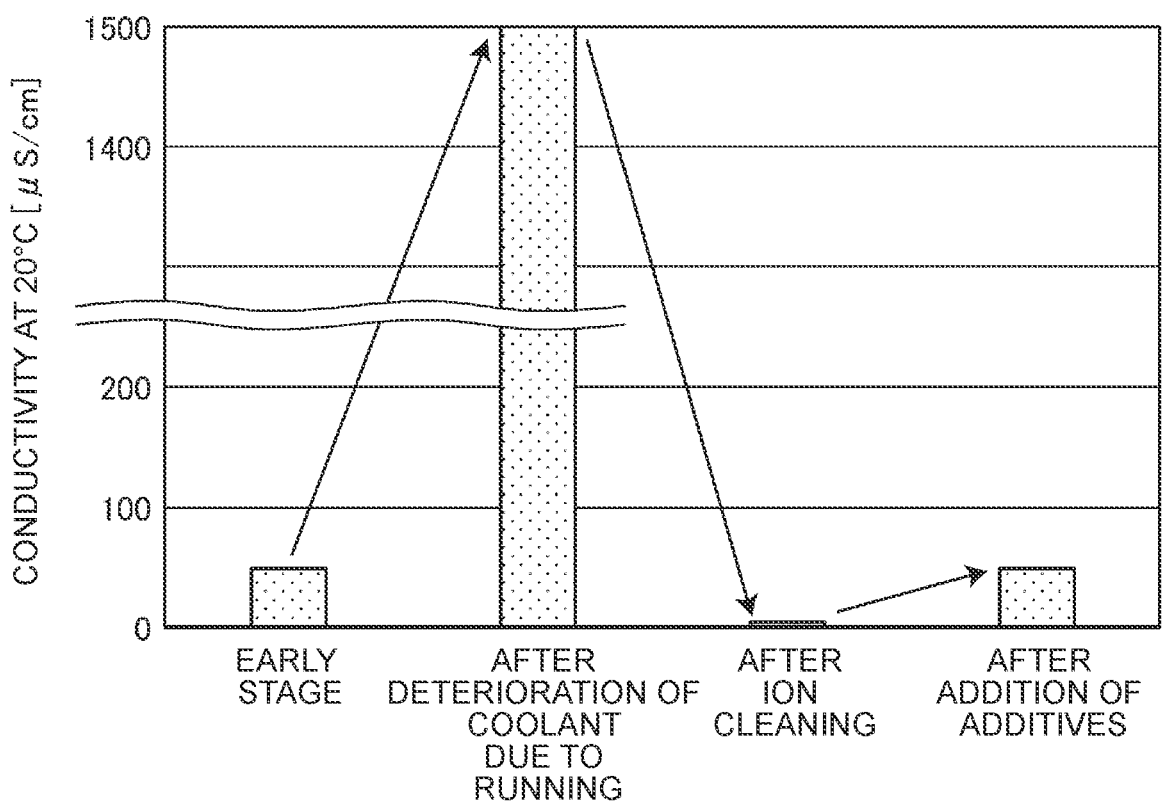
FIG. 3 is a diagram illustrating an example of the 20° C. conductivity of the cooling liquid before and after the maintenance method of the cooling system according to the embodiment.

As shown in Table 1 and FIG. 3, the initial conductivity of the cooling liquid was 50 [$\mu$S/cm], but as the deterioration progressed by running, it rose to 1500 [$\mu$S/cm]. Therefore, when the cooling liquid was ion-cleaned with the ion exchange resin, the conductivity decreased to 5 [$\mu$S/cm]. When the additive was added, the conductivity became 50 [$\mu$S/cm] which was the same as the initial conductivity.

TABLE 1

| Case | Conductivity at 20° C. [$\mu$S/cm] |
|---|---|
| Early stage | 50 |
| After deterioration of coolant due to running | 1500 |
| After ion cleaning | 5 |
| After addition of additives | 50 |

As described above, by performing the maintenance method of the cooling system according to the embodiment, the deteriorated material can be sufficiently removed, and the conductivity of the cooling liquid can be appropriately maintained.

Further advantages and variations can be readily derived by one of ordinary skill in the art. Thus, the broader aspects of the disclosure are not limited to the specific details and representative embodiments presented and described above. Accordingly, various modifications may be made without departing from the spirit or scope of the general inventive concept as defined by the appended claims and their equivalents.

What is claimed is:

1. A maintaining method for a cooling system, the maintaining method comprising:

introducing an ion exchange resin into a cooling path;

performing ion cleaning of cooling liquid in the cooling path by the ion exchange resin;

removing the ion exchange resin from the cooling path after the ion cleaning is completed; and adding an additive into the cooling path after performing the ion cleaning and after removing the ion exchange resin from the cooling path, wherein the cooling system is mounted in a battery electric vehicle including a battery installed under a floor of the battery electric vehicle.

2. The maintaining method according to claim 1, wherein the ion exchange resin is a hydrogen-ion ion exchange resin or a hydroxide-ion ion exchange resin.

3. The maintaining method according to claim 1, wherein the additive includes a rust inhibitor and an anti-foaming agent.

4. The maintaining method according to claim 1, wherein the ion exchange resin is disposed in a reserve tank and the cooling liquid is circulated by an in-vehicle pump.

5. The maintaining method according to claim 1, wherein performing ion cleaning of cooling liquid removes a deteriorated substance in the cooling liquid.

6. The maintaining method according to claim 5, wherein the deteriorated substance includes a thermally deteriorated product ion and an eluted ion.

7. The maintaining method according to claim 5, wherein the deteriorated substance is removed by utilizing the ion exchange resin at a time of a periodic maintenance of the battery electric vehicle.

\* \* \* \* \*